United States Patent
Tseng et al.

(10) Patent No.: US 7,518,837 B2
(45) Date of Patent: Apr. 14, 2009

(54) CONTROL DEVICE FOR SOFT STARTING AND PROTECTING OVERLOAD OF MOTOR

(75) Inventors: Tai-Yuan Tseng, Taipei (TW); Mu-Hsien Huang, Taipei (TW)

(73) Assignee: Uan Chung Enterprises Co., Ltd, Taipei (TW)

( * ) Notice: Subject to any disclaimer, the term of this patent is extended or adjusted under 35 U.S.C. 154(b) by 328 days.

(21) Appl. No.: 11/533,875

(22) Filed: Sep. 21, 2006

(65) Prior Publication Data
US 2008/0074811 A1    Mar. 27, 2008

(51) Int. Cl.
*H02H 7/08* (2006.01)
(52) U.S. Cl. .............................. 361/29; 361/23; 361/30; 361/31; 318/430; 318/751; 318/775; 318/778
(58) Field of Classification Search .................. 318/778, 318/775, 430, 751; 361/23, 21, 33, 88
See application file for complete search history.

(56) References Cited

U.S. PATENT DOCUMENTS

| | | | | |
|---|---|---|---|---|
| 4,412,158 A * | 10/1983 | Jefferson et al. | ............ | 318/257 |
| 4,422,030 A * | 12/1983 | McAllise | .................... | 318/779 |
| 4,704,570 A * | 11/1987 | Hopkins | .................... | 318/729 |
| 5,038,091 A * | 8/1991 | Bashark | ....................... | 318/809 |
| 5,077,512 A * | 12/1991 | Weber | ......................... | 318/776 |
| 5,105,130 A * | 4/1992 | Barker et al. | ................. | 318/268 |
| 5,280,227 A * | 1/1994 | Bashark | ....................... | 318/751 |
| 5,483,139 A * | 1/1996 | Welles, II | .................... | 318/782 |
| 5,808,441 A * | 9/1998 | Nehring | ....................... | 318/751 |
| 5,923,145 A * | 7/1999 | Reichard et al. | ............ | 318/811 |
| 6,236,177 B1 * | 5/2001 | Zick et al. | .................... | 318/362 |
| 6,320,286 B1 * | 11/2001 | Ramarathnam | ............... | 310/50 |
| 6,756,756 B1 * | 6/2004 | Chmiel et al. | ................ | 318/430 |
| 7,339,331 B2 * | 3/2008 | Vanderzon | ................... | 315/291 |
| 2006/0056127 A1 * | 3/2006 | Lewis | .......................... | 361/118 |
| 2006/0157260 A1 * | 7/2006 | Greese et al. | ................... | 173/1 |
| 2007/0174070 A1 * | 7/2007 | Jafa et al. | ....................... | 705/1 |

* cited by examiner

*Primary Examiner*—Rita Leykin

(57) ABSTRACT

A control device for soft starting and protecting overload of a motor in a power tool is disclosed. The control device comprises a power switch, a varistor, several diodes, several resistors, several capacitors, a relay, a transistor, a triac, and a microcontroller. The microcontroller is embedded with program such that, after the power switch is turned on, the microcontroller generates a smooth soft start voltage to drive the power tool. With the characteristics of power-control device, the voltage sent to motor is increased from low to full range. When the speed of motor is increased from low to the maximum, the microcontroller turns off the power-control device and turns on a relay.

19 Claims, 4 Drawing Sheets

CONTROL DEVICE FOR SOFT STARTING AND PROTECTING OVERLOAD OF MOTOR

BACKGROUND OF THE INVENTION

1) Field of the Invention

The present invention relates to a control device for soft starting and protecting overload of a motor, and more particularly to a control device for soft starting and protecting overload of a motor in a power tool capable of reducing the risk of physical damage to user's hand caused by a torque reaction.

2) Description of the Related Art

With rapid development of industrial technology, manual labors are gradually being replaced by power tools. However, the safety of using power tools is a concern. Since the rotation speed of the power-driven motor varies abruptly in a short time and the large current generates start torque when the motor is started, the user who holds the power tool may react intuitively. For example, for a user who uses a hand-held grinder, he will hold the tool firmly to prevent the tool from flying away when the power tool is started.

Further, the main deficiency of the power tool stated above is that, when the power tool is started, there exists risk of physical damage to the hand of user caused by the starting torque. Besides, although there are table-top power tools that are fixed on the table to ameliorate damage to the user's, such tools still have problems of strong vibration and power consumption.

In view of the deficiencies of power tool mentioned above, the present inventor proposes a control device for soft starting and overload protection of motor in a power tool such that the safety and convenience of using power tool is ensured.

SUMMARY OF THE INVENTION

The primary objective of the present invention is to provide a control device for soft starting and protecting overload of a motor in a power tool capable of reducing the risk of physical damage to the hand of user caused by the torque reaction.

Another objective of the present invention is to provide a control device for soft starting and overload protection of motor in a power tool, such that the motor damage caused by large instantaneous current and resultant over heat is prevented.

In accordance with the above objectives, the present invention a control device comprising a power switch, a varistor, several diodes, a plurality of resistors, a plurality of capacitors, a relay, a transistor, a triac and a microcontroller. The microcontroller is embedded with program for generating a smooth soft start signal to drive the power tool after power switch is turned on. According to an aspect of the present invention, the voltage sent to motor is increased from low to full range. When the rotation speed of motor is increased from low to the maximum, the microcontroller turns off the power-control device and turns on a relay. The power is supplied to the motor through relay. Becaused the power-control device stops working, and therefore the generation of heat can avoided and thus the service life of the peripheral electronic devices can be effectively increased.

The other features and specific embodiments of the present invention together with the accompanying drawings are described in the following.

SYMBOL DESCRIPTION OF THE MAIN DEVICES

A: Start Switch
1. Varistor
2. Diode
3. Resistor
4. Zener Diode
5. Capacitor
6. Capacitor
7~8. Resistor
9. Microcontroller
10~11. Capacitor
12. Resistor
13. Transistor
14. Triac
15. Relay
16. Resistor
17. Capacitor
18. Variable Resistor
19. Capacitor
20~23. Resistor
24. Variable Resistor
25. Comparator
26. Amplifier
27~28. Resistor
29. Capacitor
30. Protection Switch
40. Motor

DETAILED DESCRIPTION OF THE PREFERRED EMBODIMENTS

Figure 1:
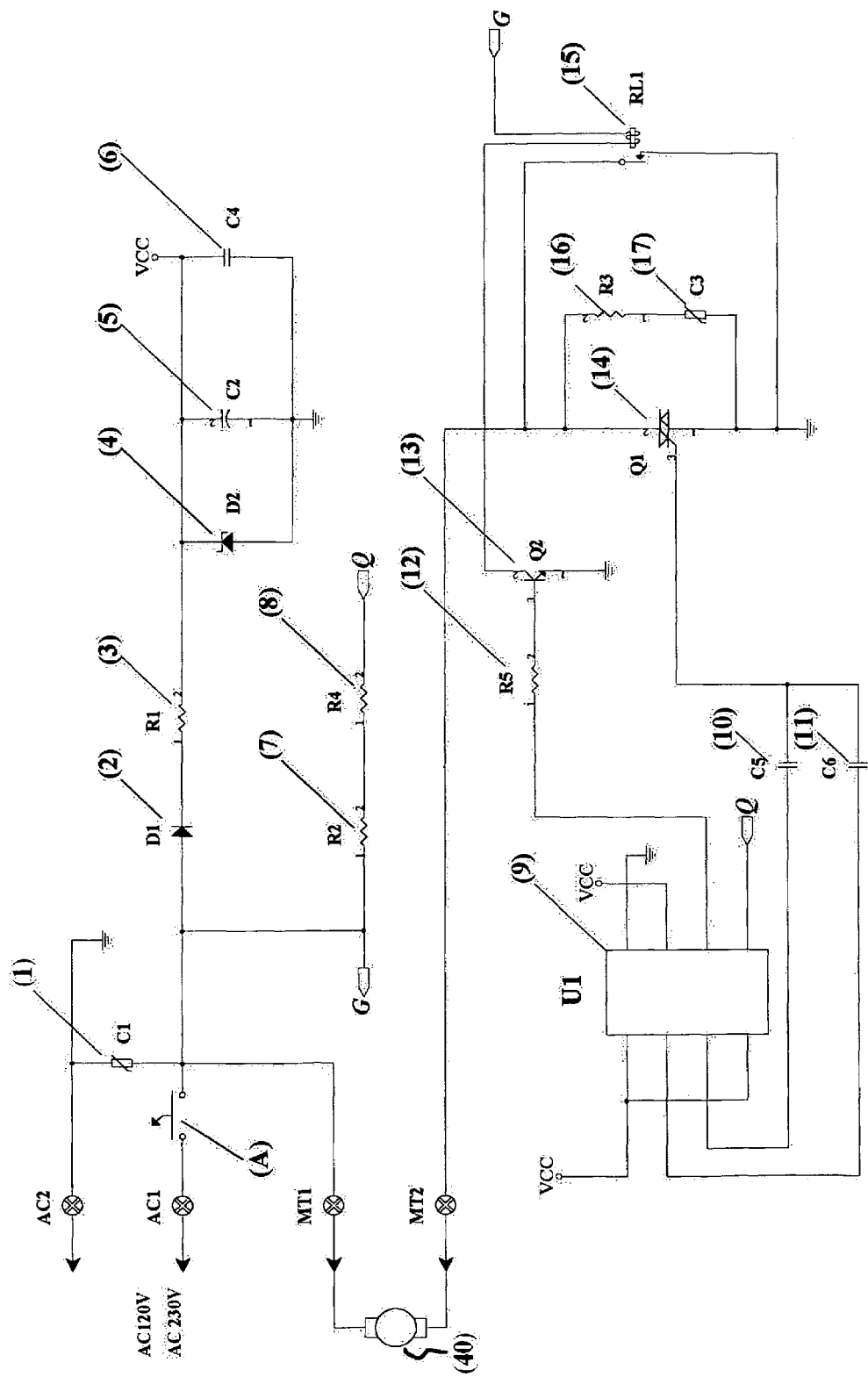
FIG. 1 shows a schematic diagram of a control device according to a first embodiment of the present invention.

FIG. 1 shows a schematic diagram of a control device according to a first embodiment of the present invention. Referring to FIG. 1, the circuit includes a start switch A, a varistor 1, a motor 40, a microcontroller 9, a transistor 13, a triac 14, a relay 15, a diode 2, a Zener diode 4, multiple resistors 3, 7, 8, 12, 16, and multiple capacitors 5, 6, 10, 11, 17. A fundamental AC power input of 120V/240V and 50/60 Hz frequency is installed adjacent to the start switch A.

The power is supplied from an external power source. When start switch A is turned on, varistor 1 retrains instantaneous surge generated by main power. The sine wave signal of power passes diode 2 to generate rectified half-wave signal. Resistor 3 retrains current, and the resistance value depends on the input voltage (AC 120V/240V). Zener diode 4 restrains voltage such that voltage is decreased to 5V. The power passing through capacitor 5, smoothens and filters the voltage, and bypass capacitor 6 is delivered to microcontroller 9 and peripheral devices. Thus, it is possible to reduce the operating voltage to 5V and the operating current to a few mA so that the objective of low power consumption may be achieved.

Figure 2:
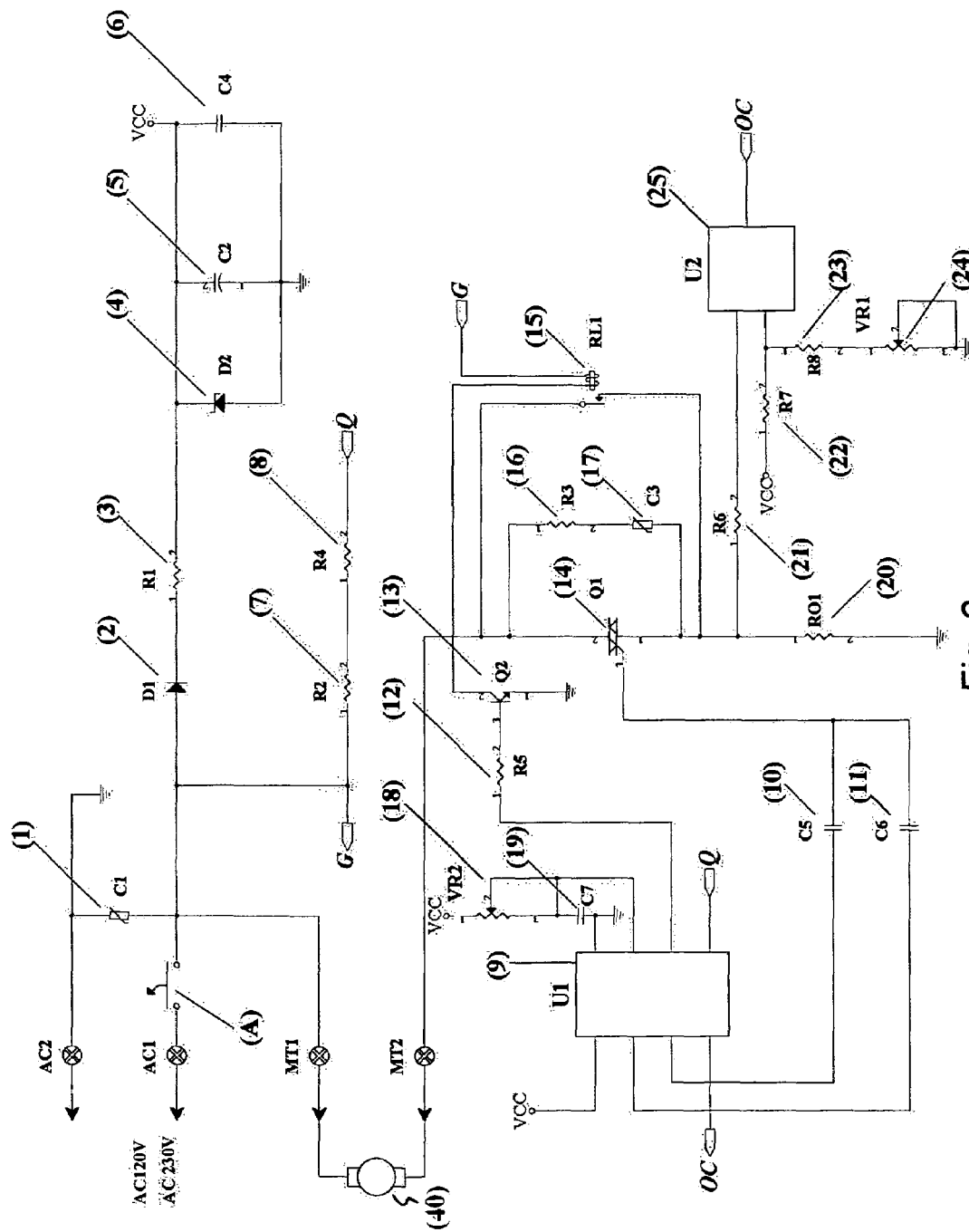
FIG. 2 shows a schematic diagram of a control device according to a second embodiment of the present invention.

FIG. 2 shows a schematic diagram of a control device according to a second embodiment of the present invention. Referring to FIG. 2, the circuit includes a start switch A, a varistor 1, a motor 40, a microcontroller 9, a transistor 13, a triac 14, a relay 15, a diode 2, a Zener diode 4, multiple resistors 3, 7, 8, 12, 16, 20, 21, 22, 23, two variable resistors 18, 24, multiple capacitors 5, 6, 10, 11, 17, 19, and a comparator 25. A fundamental AC power input of 120V/240V and 50/60 Hz frequency is installed adjacent to the start switch A.

The power is supplied from an external power source. When start switch A is turned on, varistor 1 retrains instantaneous surge generated by main power. The sine wave signal of power passes diode 2 to generate rectified half-wave signal. Resistor 3 retrains current, and the resistance value depends on the input voltage (AC 120V/240V). Zener diode 4 restrains voltage such that voltage is decreased to 5V. The power passing through capacitor 5 smoothens and filters the voltage, and bypass capacitor 6 is delivered to microcontroller 9 and peripheral devices. Thus, the power consumption can be effectively reduced.

A resistor 20 is connected to one end of the motor 40. Power is supplied to the motor 40 via the resistor 20. The resistance value of resistor 20 is a few mΩ. When the motor 40 is operated, current flows through the resistor 20, the resistor 20 generates a load-sensing voltage, and then the load-sensing voltage is sent to comparator 25 via current-limit resistor 21. The load-sensing voltage is compared with a reference voltage at the comparator 25, and a output voltage is sent to microcontroller 9. The setting of reference overload current depends on the fundamental parameters of motor 40. The safety is the main concern. For example, the rated current of circuit breaker is commonly within a range of 15 A~20 A, the current of a power tool is set around 17 A, and the overload current of motor 40 is not more than 20 A by default. The voltage Vcc is adjusted through current-limit resistor 22, resistor 23, and variable resistor 24. When the load-sensing voltage of motor 40 is ≧reference voltage, comparator 25 generates a signal to notify microcontroller 9, the microcontroller 9 determines that the motor 40 is at a status of overload exception, and the motor 40 is stopped.

Figure 3:
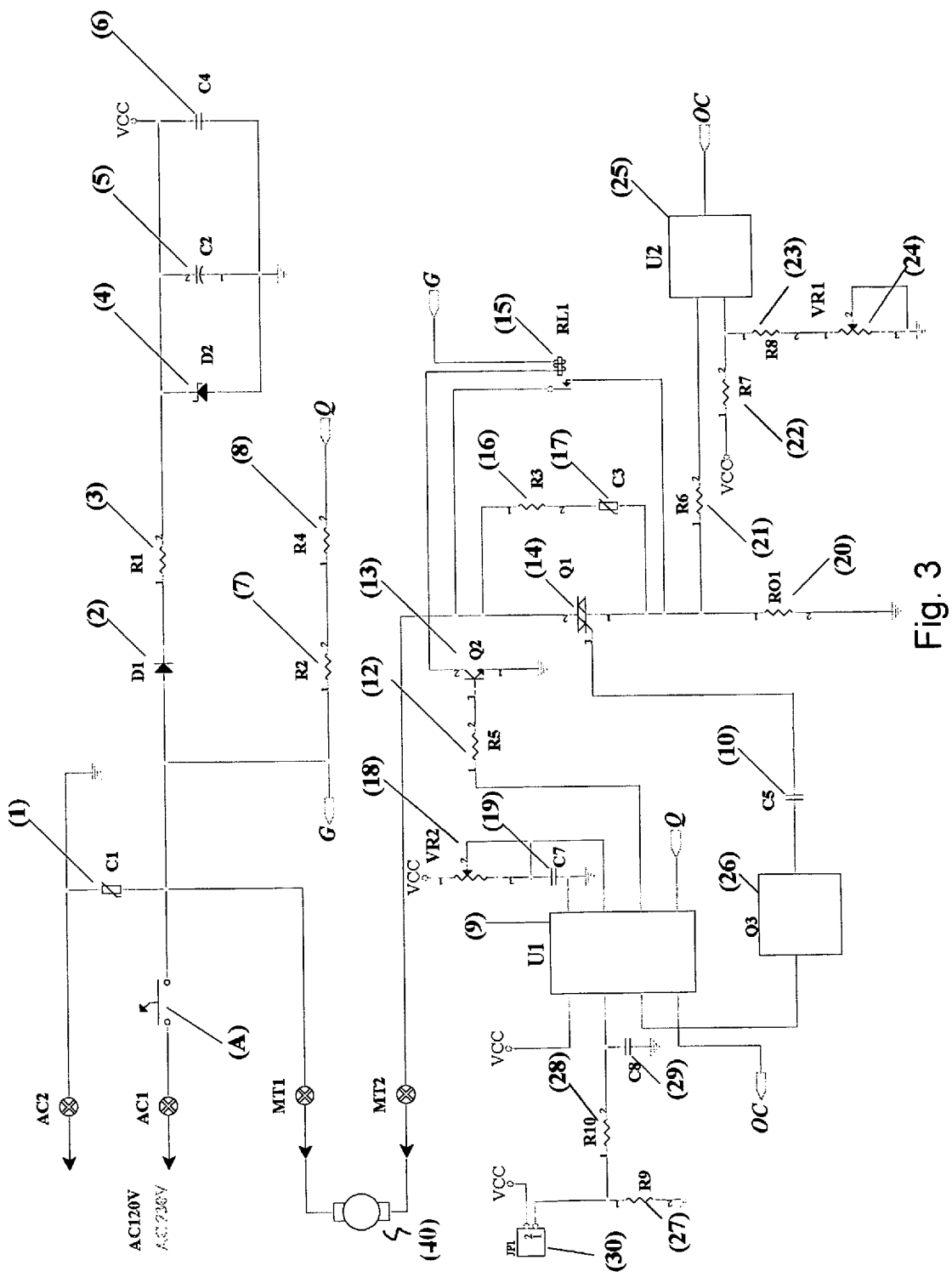
FIG. 3 shows a schematic diagram of a control device according to a third embodiment of the present invention.

FIG. 3 shows a schematic diagram of a control device according to a third embodiment of the present invention. Referring to FIG. 3, the circuit includes the start switch A, the varistor 1, the motor 40, the microcontroller 9, the transistor 13, the triac 14, the relay 15, the diode 2, the Zener diode 4, multiple resistors 3, 7, 8, 12, 16, 20, 21, 22, 23, 27, 28, two variable resistors 18, 24, multiple capacitors 5, 6, 10, 11, 17, 19, 29, the comparator 25, an amplifier 26, and a protection switch 30. A fundamental AC power input of 120V/240V and 50/60 Hz frequency is installed beside the start switch A.

The power is supplied from an external power source. When start switch A is turned on, varistor 1 retrains instantaneous surge generated by the main power. The sine wave signal of power passes through the diode 2 to generate rectified half-wave signal. Resistor 3 retrains current, and the resistance value depends on the input voltage (AC 120V/ 240V). Zener diode 4 restrains voltage such that voltage is reduced to 5V. The power passing through the capacitor 5 and bypass capacitor 6 smoothen and filter the voltage is delivered to microcontroller 9 and peripheral devices. The power consumption is thereby reduced.

A resistor 20 is connected to one terminal of the motor 40. Power is supplied to the motor 40 via the resistor 20,. The resistance value of resistor 20 is a few mΩ. When the motor 40 is operated, current flows through resistor 20, the resistor 20 generates a load-sensing voltage, and then the load-sensing voltage is sent to comparator 25 via current-limit resistor 21. The load-sensing voltage is compared with reference voltage at the comparator 25, and then an output voltage is sent to microcontroller 9. The setting of reference overload current depends on the fundamental parameters of motor 40. The safety is the main concern. For example, the rated current of circuit breaker is commonly in a range of about 15 A~20 A, the current of a power tool is set around 17 A, and the overload current of motor 40 is not more than 20 A by default. The supplied Vcc is adjusted through current-limit resistor 22, resistor 23, and variable resistor 24. When the load-sensing voltage of motor 40 is ≧reference voltage, the comparator 25 generates a signal to notify microcontroller 9 that the motor 40 is at a status of overload exception, and the motor 40 is stopped.

Figure 4:
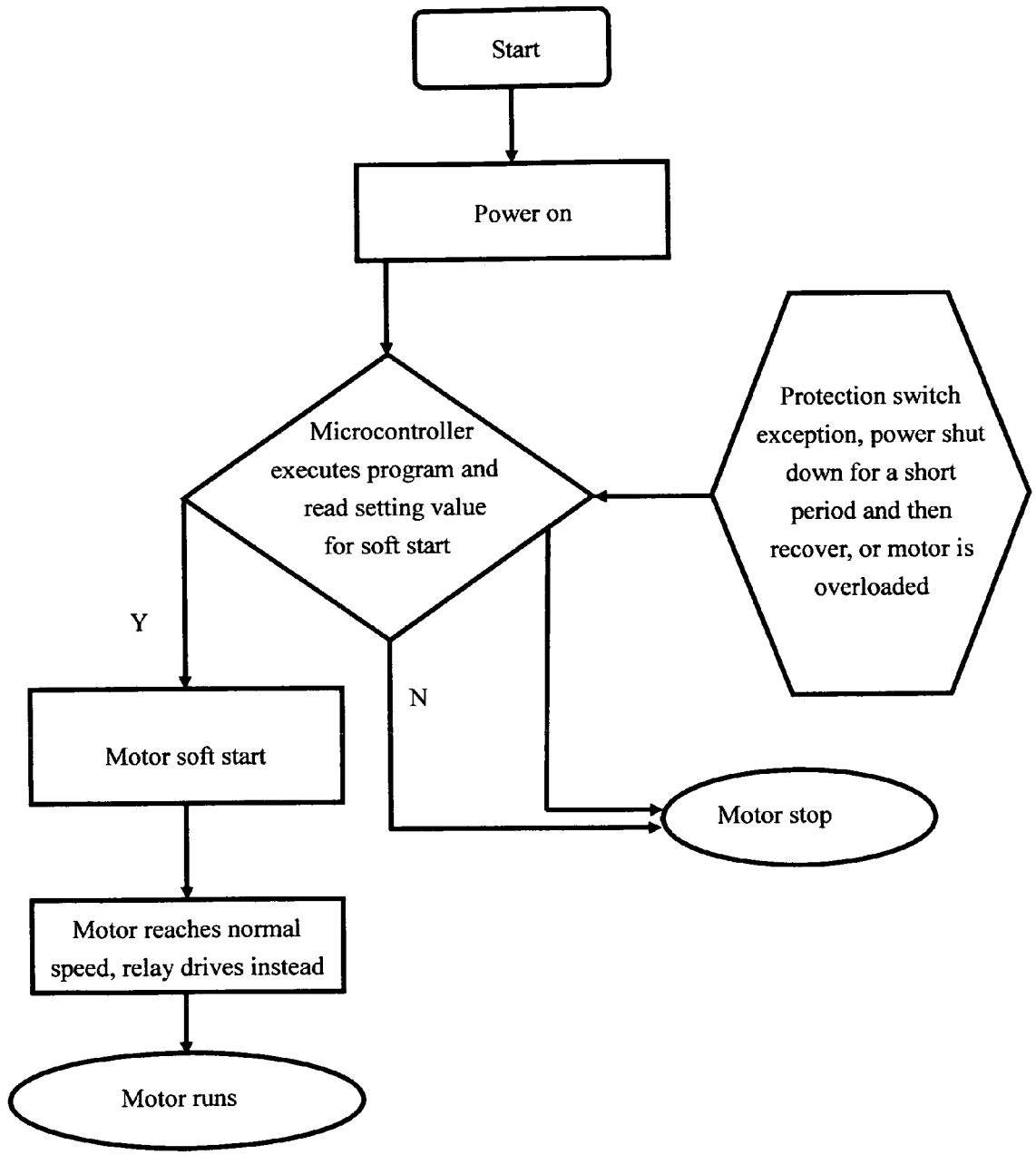
FIG. 4 shows a flow chart for describing the operation of the embodiments according to the present invention.

FIG. 4 shows a flow chart for describing the operation of the embodiments according to the present invention. Referring to FIG. 3 and FIG. 4, if the voltage at a point between current-limit resistor 28 and capacitor 29 is a positive voltage, the protection switch is determined to be normal. On the other hand, if the external signal is open, i.e., the resistor 27 provides a negative voltage, the microcontroller 9 concludes that there exists a signal exception, and stops the motor 40. If protect switch 30 has an input signal when the motor 40 is running normally, the motor 40 is stopped. Even if the input signal is recovered, the motor 40 remains off mode. Accordingly, the present invention is capable of reducing the risk when the power supply to the tool is on. Therefore, whenever microcontroller 9 detects an exception, the motor 40 has to be restarted.

When the power of microcontroller 9 remains in the normal status, the control signal is sent to capacitor 10 through amplifier 26 to form a gate driver to control the soft start signal. Since the triac 14 allows bi-directional current flow, it is suitable for AC power control. The control signal output from microcontroller 9 controls the soft start of voltage such that the voltage rises smoothly and the motor 40 runs from low speed to high speed smoothly.

When motor 40 works in soft start mode and after the motor 40 runs from low speed to high speed, the control signal sent out from microcontroller 9 transmits through current-limit resistor 12 and transistor 13 to control relay 15. Thus, the contact of relay 15 is connected. The function of the triac 14 for controlling the voltage of motor 40 is then transferred to the main contact of relay 15. Meanwhile, the main contact of relay 15 maintains the normal running of motor. The heat source caused by using triac 14 is completely avoided. Thus, problem due to high temperature of the device is resolved, and therefore the lifespans of the device and peripheral devices can be effectively increased.

Moreover, in the embodiments according to the present invention, if the power switch A used is UNLOCK type, the microcontroller 9 determines an exception when the switch is repeatedly turned on and off during a short time period. For the power switch A of LOCK ON/LOCK OFF type, even if the motor 40 runs normally when the switch is turned on, the microcontroller 9 will determine an exception and stop the motor 40 when the power is shut down abruptly and turned on immediately. Besides, when the motor 40 works normally, the problem caused by the tool or other external factors may stop the motor 40 (e.g., jammed by the wood when sawing a lumber). On this occasion, resistor 21 connected to motor 40 will generate a voltage signal, which is compared with the reference voltage, if the generated voltage is larger than the setting, the comparator 25 will send a signal to the microcontroller 9. The microcontroller determines such a condition as an exception and stops the motor 40.

Furthermore, some power tools are equipped with external safety mechanism, such as protection mask, emergency switch, or limit switch, to prevent from arbitrarily starting the motor 40. Taking the protection mask as an example, if the protection mask is not closed or opened while the motor 40 is working normally, the microcontroller 9 will determine such conditions as exceptions and stop the motor 40.

In summary, the present invention provides a practical control device for soft starting and overload protection of motor in a power tool.

Although the preferred embodiment of the present invention has been described, various modifications and enhancements may be made without departing from the spirit and scope of the present invention. Accordingly, the invention is not limited except as by the appended claims.

What is claimed is:

1. A control device for soft starting and protecting overload of a motor in a power tool, comprising: a power switch; a varistor; a motor; a microcontroller; a transistor; a triac; a relay; a diode; a Zener diode; multiple resistors; and multiple capacitors, wherein when the power switch is turned on, the varistor restrains instantaneous surge generated by a main power, a sine wave signal of main power passes through the diode to generate rectified half-wave signal, the resistors restrain current, and the zener diode restrains voltage such that voltage is reduced and supplied to the microcontroller, the microcontroller sends a control signal through triac to soft start a voltage supply and increase a value of the voltage supply smoothly such that the motor rotates evenly from a low speed to a high speed.

2. The control device for soft starting and protecting overload of a motor in a power tool according to claim 1, wherein preset time for soft start is implemented by using different program codes embedded in the microcontroller of the control device.

3. A control device for soft starting and protecting overload of a motor in a power tool according to claim 1, wherein preset time for soft start is adjusted through the variable resistors from the multiple resistors in the control device.

4. A control device for soft starting and protecting overload of a motor in a power tool according to claim 1, wherein the comparator sends a signal to the microcontroller when the load-sensing voltage of motor is ≧reference voltage, and the microcontroller determines it as an overload exception and stops the motor.

5. The control device for soft starting and protecting overload of a motor in a power tool according to claim 1, wherein the motor is restarted after being stopped.

6. The control device for soft starting protecting overload of a motor in a power tool according to claim 1, wherein the power tool is equipped with an external safety mechanism to start the motor.

7. A control device for soft starting and protecting overload of a motor in a power tool, the control device is a control circuit which mainly consists of a power switch, a varistor, a motor, a microcontroller, a transistor, a triac, a relay, a diode, a Zener diode, multiple resistors, two variable resistors, multiple capacitors and a comparator, wherein when the power switch is turned on, the varistor restrains instantaneous surge generated by a main power, a sine wave signal of main power passes through the diode to generate rectified half-wave signal, the resistors restrain current, and the zener diode restrains voltage such that voltage is reduced and supplied to the microcontroller, the microcontroller sends control signal through triac to soft start a voltage supply and increase a value of the voltage supply smoothly such that the motor rotates evenly from a low speed to a high speed, and the comparator compares a load-sensing voltage of the motor with a reference voltage.

8. The control device for soft starting and protecting overload of a motor in a power tool according to claim 7, wherein preset time for soft start is implemented by using different program codes embedded in the microcontroller of the control device.

9. A control device for soft starting and protecting overload of a motor in a power tool according to claim 7, wherein preset time for soft start is adjusted through the variable resistors from the multiple resistors in the control device.

10. A control device for soft starting and protecting overload of a motor in a power tool according to claim 7, wherein the comparator sends a signal to the microcontroller when the load-sensing voltage of motor is ≧reference voltage, and the microcontroller determines it as an overload exception and stops the motor.

11. The control device for soft starting and protecting overload of a motor in a power tool according to claim 7, wherein the motor is restarted after being stopped.

12. The control device for soft starting protecting overload of a motor in a power tool according to claim 7, wherein the power tool is equipped with an external safety mechanism to start the motor.

13. A control device for soft starting and protecting overload of a motor in a power tool, the control device is a control circuit which mainly consists of a power switch, a varistor, a motor, a microcontroller, a transistor, a triac, a relay, a diode, a Zener diode, multiple resistors, two variable resistors, multiple capacitors, a comparator, an amplifier and a protection switch, wherein when the power switch is turned on, the varistor restrains instantaneous surge generated by a main power, a sine wave signal of main power passes through the diode to generate rectified half-wave signal, the resistors restrain current, and the zener diode restrains voltage such that voltage is reduced and supplied to the microcontroller, the microcontroller sends a control signal through triac to soft start the voltage supply and increase a value of the voltage supply smoothly such that the motor rotates evenly from a low speed to a high speed, and wherein the comparator compares a load-sensing voltage of the motor with a reference voltage, and the microcontroller stops the motor when the protection switch receives an input signal.

14. The control device for soft starting and protecting overload of a motor in a power tool according to claim 13, wherein preset time for soft start is implemented by using different program codes embedded in the microcontroller of the control device.

15. A control device for soft starting and protecting overload of a motor in a power tool according to claim 13, wherein preset time for soft start is adjusted through the variable resistors from the multiple resistors in the control device.

16. A control device for soft starting and protecting overload of a motor in a power tool according to claim 13, wherein the comparator sends a signal to the microcontroller when the load-sensing voltage of motor is ≧reference voltage, and the microcontroller determines it as an overload exception and stops the motor.

17. The control device for soft starting and protecting overload of a motor in a power tool according to claim 13, wherein the motor is restarted after being stopped.

18. The control device for soft starting and protecting overload of a motor in a power tool according to claim 13, wherein the power tool is equipped with an external safety mechanism to start the motor.

19. The control device for soft starting and protecting overload of a motor in a power tool according to claim 18, wherein the safety mechanism comprises a protection mask, an emergency switch or a limit switch.

* * * * *